United States Patent [19]

Takahashi et al.

[11] Patent Number: 5,205,352
[45] Date of Patent: Apr. 27, 1993

[54] HEAT EXCHANGER FOR CONDENSING VAPOR INTO LIQUID PHASE, POWER GENERATING PLANT USING THE HEAT EXCHANGER AND ABSORPTION REFRIGERATOR USING THE HEAT EXCHANGER

[75] Inventors: Fumio Takahashi, Hitachi; Iwao Harada, Mito; Yasuo Fujitani, Ibaraki; Michihiko Aizawa, Ushiku, all of Japan

[73] Assignee: Hitachi, Ltd., Tokyo, Japan

[21] Appl. No.: 827,934

[22] Filed: Jan. 29, 1992

[30] Foreign Application Priority Data

Jan. 29, 1991 [JP] Japan .................. 3-008913

[51] Int. Cl.$^5$ .................................. F28B 1/02
[52] U.S. Cl. .................. 165/113; 165/146; 62/476; 60/692
[58] Field of Search ............ 165/113, 114, 146; 62/476

[56] References Cited

U.S. PATENT DOCUMENTS

| | | | |
|---|---|---|---|
| 1,662,186 | 3/1928 | Grace | 165/114 |
| 1,704,484 | 3/1929 | Lucke | 165/114 |
| 1,718,466 | 6/1929 | Kirgan | 165/114 |
| 1,845,546 | 2/1932 | Smith | 165/114 |
| 3,061,273 | 10/1962 | Dean, Jr. et al. | 165/114 |
| 3,131,552 | 5/1964 | McNeely | 62/475 |

FOREIGN PATENT DOCUMENTS

61-114087 5/1986 Japan .

Primary Examiner—Allen J. Flanigan
Attorney, Agent, or Firm—Antonelli, Terry, Stout & Kraus

[57] ABSTRACT

A heat exchanger for condensing into liquid phase a vapor containing non-condensable gas components through heat exchange with a heat exchanging medium has a vessel having a vapor inlet for receiving the vapor containing the non-condensable gas components and a discharge port for the non-condensable gas components. The heat exchanger further has a tube nest disposed in the vessel and having a plurality of tubes through which the heat exchanging medium flows. The vapor containing non-condensable gas components flows towards the discharge port across the tube nest so as to be condensed into liquid phase through heat exchange with the heat exchanging medium flowing through the tubes, so that the non-condensable gas components are separated from the liquid phase and flow towards the discharge port. The tube nest is constructed to create a change in the dynamic pressure of flow of the vapor towards the discharge port to cause such a static pressure distribution in the heat exchanger that a lower static pressure is established in a region where the discharge port is provided than in a region where the vapor inlet is provided.

12 Claims, 10 Drawing Sheets

FLOW OF STEAM

FIG. 3B
PRIOR ART

STATIC PRESSURE

FIG. 3C
PRIOR ART

NON-CONDENSABLE GAS PRESSURE DISTRIBUTION

FIG. 4A

FLOW OF STEAM

FIG. 4B

STATIC PRESSURE

FIG. 4C

NON-CONDENSABLE GAS PRESSURE DISTRIBUTION

HEAT EXCHANGER FOR CONDENSING VAPOR INTO LIQUID PHASE, POWER GENERATING PLANT USING THE HEAT EXCHANGER AND ABSORPTION REFRIGERATOR USING THE HEAT EXCHANGER

BACKGROUND OF THE INVENTION

1. Field of the Invention

The present invention relates to a heat exchanger and, more particularly, to a heat exchanger for condensing vapor containing non-condensable gas and to a power generating plant as well as an absorption refrigerator which incorporates such a heat exchanger.

2. Description of the Prior Art

Condensers are used as heat exchangers for condensing or liquefying vapor such as steam contained in a gaseous mixture which is exhausted from, for example, a steam turbine of a nuclear or ordinary thermal power generating plant and which also contains non-condensable gases such as air.

In general, a condenser has a tube nest composed of a plurality of cooling tubes. In order to improve heat transfer performance of the condenser, it is absolutely necessary to reduce pressure loss of the gaseous mixture posed by the cooling tubes and to remove non-condensable gas. Reduction in the pressure loss enables the gaseous mixture to reach a core region of the tube nest so that the cooling tubes in the core region also can effectively contribute to the condensation. Non-condensable gas such as air, when introduced into the condenser, forms a film or layer on cooling tubes to impede condensation. Removal of such non-condensable gas, therefore, improves condensation of the steam.

Japanese Unexamined Patent Publication No. 61-114087 proposes a condenser which is improved to reduce pressure loss while facilitating removal of non-condensable gas. This condenser has a tube nest which has radially outer portion in which tube groups and steam access lanes are arranged alternately and a radially inner core region in which tube groups are arranged densely. A non-condensable gas discharge port is provided in the core portion of the core region where tube groups are arranged densely. In this condenser, the gaseous mixture containing steam and non-condensable gases is introduced through the steam access lanes in the radially outer region so that the pressure drop is reduced as compared with known condensers in which tubes are uniformly arranged at high density. The core region having high density of heat transfer tubes effectively liquefies the steam and gases which could not be condensed are discharged through the non-condensable gas discharging port.

The condenser disclosed in Japanese Unexamined Patent Publication No. 61-114087 is constructed on an assumption that the gaseous mixture including steam flows only along the steam access lanes. In order to condense the steam which could not be condensed on the tubes in the radially outer region, all the steam passages are led to the central core region where the cooling tubes are arranged densely. Consequently, the following two problems are encountered with this type of condenser.

Firstly, it is to be pointed out that the non-condensable gases tend to be led to low-pressure portions which are formed in the condenser due to specific patterns of streams of the gaseous mixture and unevenness or local variation of the condensation taking place in the condenser. Thus, a considerable portion of the non-condensable gases fails to flow into the core region of the condenser. This makes it difficult to efficiently discharge non-condensable gases, resulting in stagnation of such gases within the condenser.

The second problem is that the pressure loss is large because of the highly dense arrangement of cooling tubes in the core region arranged to occupy a large area facing the outlet ends of the steam access lanes. This pressure loss lowers the temperature of saturated steam, which in turn lowers the heat transfer.

SUMMARY OF THE INVENTION

Accordingly, a first object of the present invention is to provide a heat exchanger having a high condensation efficiency realized by effective removal of non-condensable gases.

A second object of the present invention is to provide a power generating plant which incorporates, as a steam condenser, a heat exchanger mentioned above.

A third object of the present invention is to provide a power generating plant which incorporates, as an absorber, a heat exchanger mentioned above.

In general, a liquefying apparatus such as a steam condenser has a tube nest composed of many heat transfer tubes as explained before. The tube nest is designed to have tube groups where the tubes are densely arranged and steam access lanes where the tubes are arranged at low density or not tubes are provided. Although the tubes in each tube group are arranged densely, steam can flow through small gaps between the tubes although the flow rate is small. Cooling tubes also are used in other types of heat exchangers. For instance, in certain types of heat exchangers, heat transfer tubes are regularly arranged in a plurality of groups defining different planes, such that steam access lanes are formed between adjacent planes. In this type of heat exchanger, steam cannot flow at a large rate through the tube groups because a large flow resistance is produced across each tube group. Consequently, steam is introduced into the tube nest mainly through the steam access lanes so as to be condensed on the surface of the cooling tubes in the tube nest.

It has been determined that static pressure inside a heat exchanger or condenser of the type described is determined by the flowing velocity of the gaseous mixture in such heat exchanger or condenser. For instance, in the case of a steam condenser used in a power generating plant, the full pressure, i.e., the sum of static pressure and dynamic pressure, of the steam introduced from a steam turbine into the condenser is regarded as being uniform because the steam outlet of the steam turbine is restricted in area and directs the steam substantially uniformly into steam access lanes in the condenser. In addition, steam encounters only a small resistance when it flows along each steam access lane. Consequently, the full pressure in every portion of each steam access lane can be regarded as being substantially equal to that at the steam inlet portion. This means that the static pressure in each steam access lane relies upon change in the dynamic pressure attributable to change in the flowing velocity of the steam. Static pressure in each tube group balances with the static pressure in the portion of the steam access lane connected to the tube group, because the flowing velocity in the tube group is small. By elevating the dynamic pressure in the portion of the steam access lane near the non-condensable gas discharging port, it is possible to obtain such a static pressure distribution in the condenser that the static pressure is substantially lower in the portion near the non-condensable gas discharging port than in other portions. Such a static pressure distribution causes the non-condensed gases to flow in accordance with the gradient of the static pressure, i.e., towards the discharging port where the static pressure is low. In other words, it is possible to efficiently discharge and remove non-condensable gases by providing the non-condensable gas discharging port in the steam access lane in which the steam flows at a high velocity.

The static pressure inside the condenser can be determined in the following manner. Assuming that the rate of condensation on the surfaces of the heat transfer tubes is approximately constant, the amount of steam flowing through the steam access lanes is proportional to the heat transfer area provided by the heat transfer tubes. The flow velocity of steam, therefore, is in proportion to the heat transfer area and is in inverse proportion to the cross-sectional area of the steam access lane. It is therefore possible to increase the steam velocity towards the non-condensable gas discharging port, i.e., to reduce the static pressure in the area around the non-condensable gas discharging port, so as to concentrate the non-condensed gases to the region where the non-condensable gas discharging port is provided, by designing the tube nest such that the heat transfer area progressively increases or such that the cross-sectional area of the steam access lane decreases towards the non-condensable gas discharging port. This can be achieved by providing a plurality of steam passages in parallel relationship such that different steam access lanes have different cross-sectional areas or different tube groups have different heat transfer areas, i.e., different numbers of heat transfer tubes, thereby creating difference in the steam flowing velocity between adjacent steam access lanes.

According to one aspect of the present invention, a heat exchanger is provided for performing a heat exchange between a vapor containing non-condensable gas components and a heat exchanging medium, thereby condensing the vapor into liquid phase, with the heat exchanger comprising a vessel having a vapor inlet for receiving the vapor containing the non-condensable gas components and a discharge port through which the non-condensable gas components are to be discharged, and a tube nest disposed in the vessel and having a plurality of tubes through which the heat exchanging medium flow. The vapor containing non-condensable gas components flow towards the discharge port across the tube nest so as to be condensed into liquid phase through heat exchange with the heat exchanging medium flowing through the tubes while the non-condensable gas components are separated from the liquid phase and flow towards the discharge port. The tube nest produces a change in the dynamic pressure of flow of the vapor towards the discharge port, thereby creating such a static pressure distribution in the heat exchanger such that a lower static pressure is established in a region where the discharge port is provided than in a region where the vapor inlet is provided.

According to another aspect of the present invention, a power generating plant is provided which utilizes, as a steam condenser, the heat exchanger of the present invention.

According to still another aspect of the invention, an absorption refrigerator is provided which utilizes, as an absorber, the heat exchanger of the present invention.

The above and other objects, features and advantages of the present invention will be made more apparent by the following description of the preferred embodiments.

DESCRIPTION OF THE PREFERRED EMBODIMENTS

Figure 1:
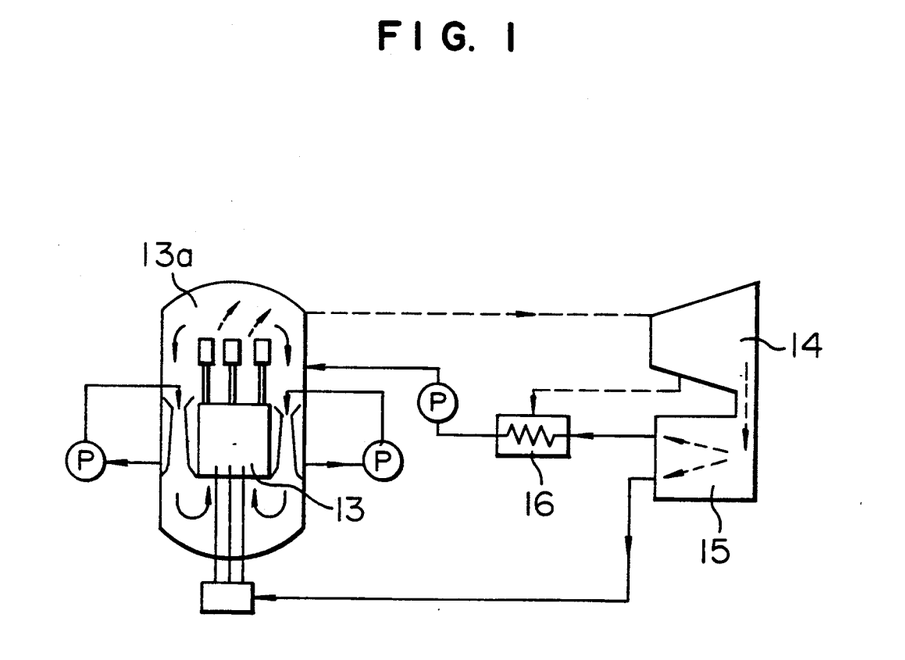
FIG. 1 is a schematic view of a boiling water type nuclear power generating plant embodying the present invention.

Referring to FIG. 1, a boiling water type nuclear power generating plant has a reactor core 13 and a steam generator 13a which generates steam by the heat produced in the reactor core 13. The steam generated in the steam generator 13a expands through a high pressure turbine and a low pressure turbine generally designated at 14 so as to drive these turbines. The steam exhausted after driving the turbines is condensed in the condenser 15. A part of the condensate is returned to the reactor core while the remainder of the condensate is returned to the steam generator 13a after being heated in a heater 16 by steam which has been extracted from the high pressure turbine.

The greater the ratio of the steam pressure at the turbine inlet to the steam pressure at the turbine outlet, the higher the power generating efficiency. The steam pressure at the outlet of the steam turbine 14 can be lowered by improving the heat transfer coefficient in the condenser through efficient separation and discharge of non-condensable gases from the steam exhausted from the turbine. It is therefore possible to improve the power generating efficiency by using such a condenser. This applies also to the cases of ordinary thermal power generating plants.

Figure 2:
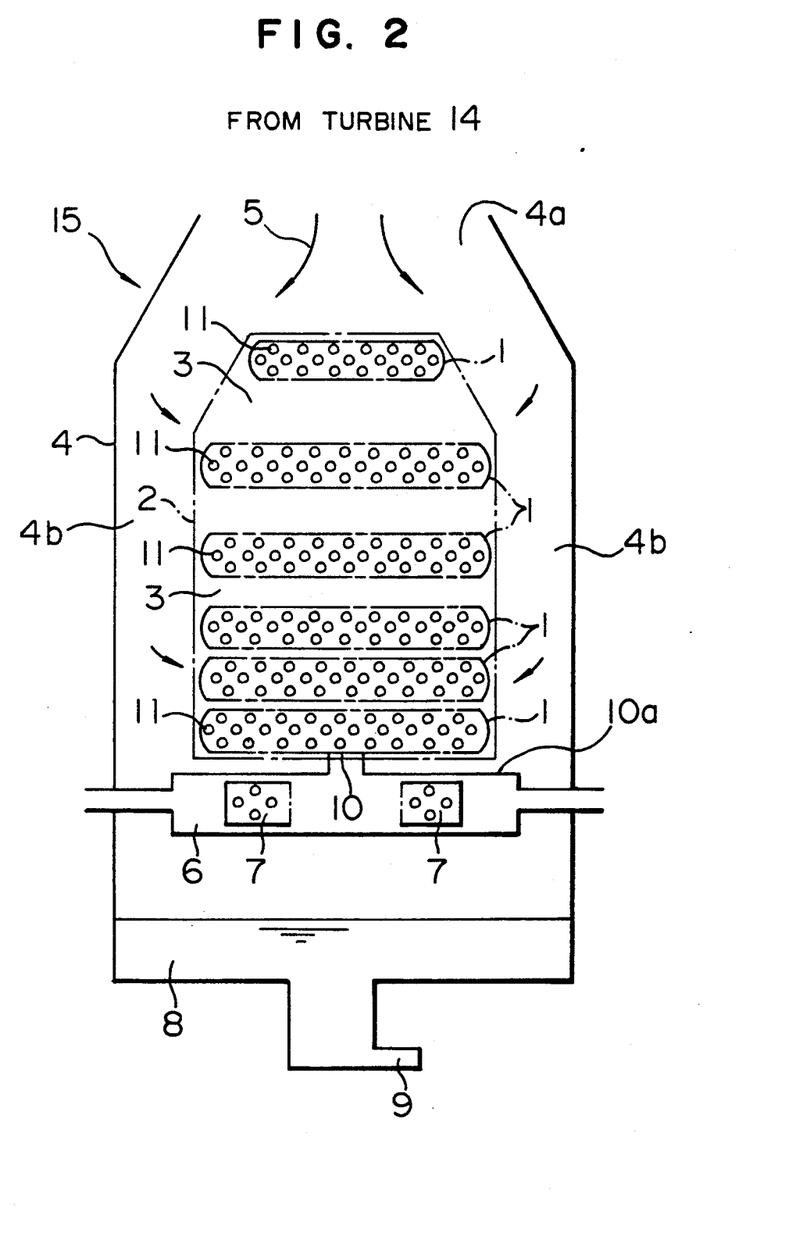
FIG. 2 is a sectional view of a heat exchanger of the present invention used as a steam condenser in the power generating plant shown in FIG. 1.

Referring to FIG. 2, the condenser 15 shown in FIG. 1 includes a vessel 4 having an inlet 4a connected to the steam outlet of the turbine 14. A tube nest generally designated by the reference numeral 2 is disposed in the vessel 4 in alignment with the steam inlet 4a. The tube nest 2 is composed of a series of tube groups 1 which are arranged in parallel. Each tube group 1 has a plurality of parallel cooling tubes 11. These tube groups 1 have substantially the same construction in terms of the locations of the cooling tubes, pitch of arrangement of the cooling tubes and so forth. Thus, all the tube groups 1 have almost equal heat transfer area.

Steam access lanes 3 are defined by pairs of adjacent tube groups 1. The steam access lanes 3 communicate with the steam inlet 4a through additional lanes 4b which are formed between both side walls of the vessel 4 and the tube nest 2. The arrangement is such that the widths of the steam access lane 3 in terms of the distance between adjacent tube groups 1 decrease towards the downstream end of the condenser as viewed in the direction of flow of the stream. A discharge port 10 communicates with the most downstream tube group 1. The discharge port 10 communicates with the exterior of the vessel 4 through a duct 10a. The duct 10a has an air cooler 6 having cooling tubes 7 for cooling air. The bottom portion of the vessel 1 beneath the duct 10a forms a condensate reservoir 8 which has a condensate outlet 9.

In operation, steam discharged from the turbine 14 of FIG. 1 is introduced into the vessel 4 through an inlet 4a as indicated by arrows 5 in FIG. 2. The steam then flows through additional lanes 4b and enters successive steam access lanes 3 in the tube nest 2. The steam then flows into each tube group 1 so as to flow in contact with the cooling tubes 11 which constitute the tube group 1. Consequently, heat is exchanged across the wall of each cooling tube 11 between the steam and a cooling medium such as water which flows in the cooling tube 11, so that the steam is condensed and liquefied on the surface of the cooling tube 11. Meanwhile, non-condensable components contained in the steam flows into the air cooler 6 disposed in the duct 10a through the tube nest 2 and the discharge port 10. The gaseous mixture composed of the steam which has not been liquefied and non-condensable components is cooled through contact with the tubes 7 of the air cooler 6 so that the non-liquefied steam is condensed into liquid phase. Consequently, non-condensable gas components alone are discharged to the exterior of the vessel 4. The liquid droplets formed as a result of condensation in the tube nest and in the air cooler 6 are allowed to fall into the condensate reservoir 8 and the liquid phase thus collected is returned to the steam generator through the condensate outlet 9.

All the tube groups 1 have almost the same density of heat transfer tubes, so that the rates of condensation of steam is approximately equal in all tube groups 1. Furthermore, all these tube groups 1 have an almost equal vertical width as viewed in FIG. 2. Consequently, greater velocities of steam are established in the steam access lanes 3 having smaller widths. Consequently, assuming that the full pressure at the steam inlet 4a is constant, higher steam velocities are obtained in the steam access lanes 3 having smaller widths, i.e., in the steam access lanes 3 closer to the downstream end of the condenser. In each tube group 1, static pressure is established in the equilibrium or balance with the static pressures in adjacent steam access lanes 3. Therefore, when the velocity component of the steam flowing from the steam access lanes 3 into the tube group 1 is small, the static pressure established in the tube group 1 is substantially equal to the static pressure in the steam access lanes 3. Consequently, a static pressure gradient is established across the tube nest, i.e., in the direction perpendicular to the steam access lanes 3, such that the static pressure decreases towards the lower end of the condenser. This static pressure gradient induces a flow of steam across the steam access lanes 3, from the top to the bottom of the tube nest 2, whereby the non-condensable gases in the steam are conveyed by the steam so as to be concentrated to the lower portion of the condenser. Consequently, the concentration of the non-condensable gases is maximized in the bottom region of the condenser where the non-condensable gas discharging port 10 is provided, so that non-condensable gas can efficiently be discharged to the exterior of the condenser.

Figure 3A:
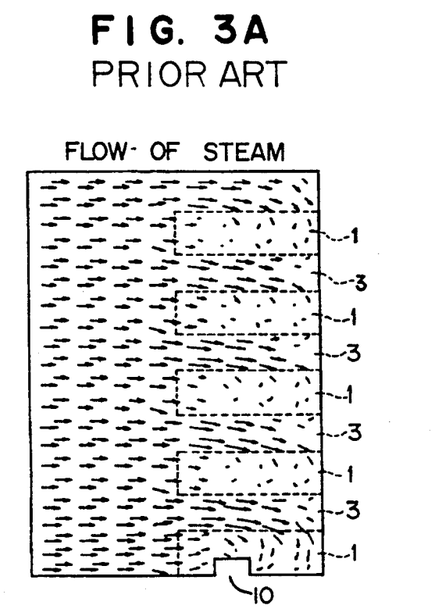
FIGS. 3A to 3C are illustrations of the results of numerical analysis of flow of fluid in a conventional steam condenser.
Figure 3B:
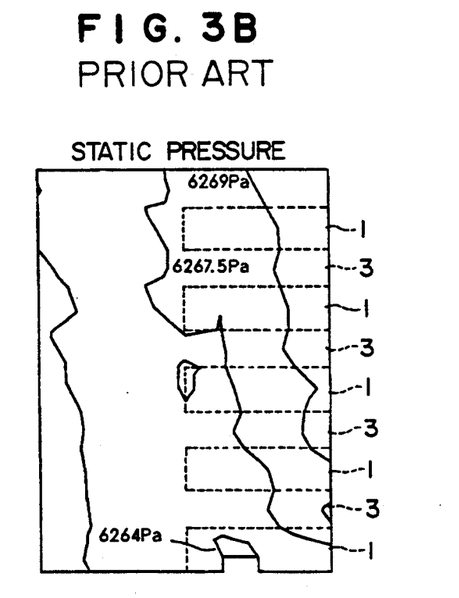
Figure 3C:
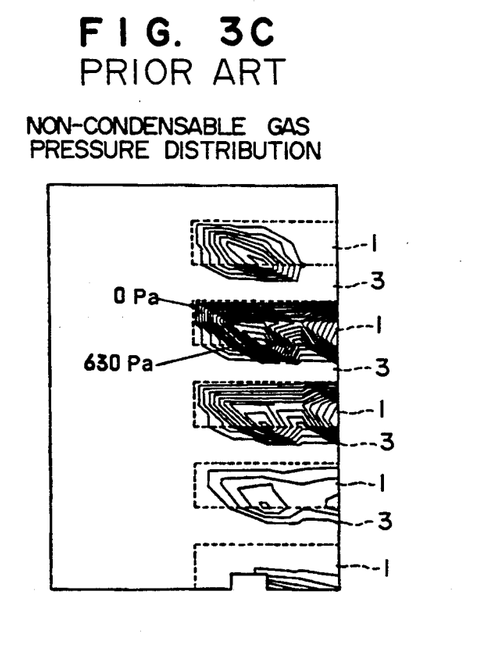
Figure 4A:
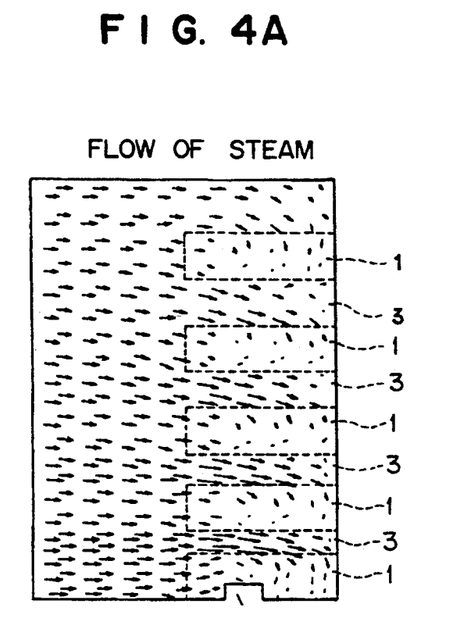
FIGS. 4A to 4C are illustrations of the results of numerical analysis of flow of fluid in the steam condenser shown in FIG. 2.
Figure 4B:
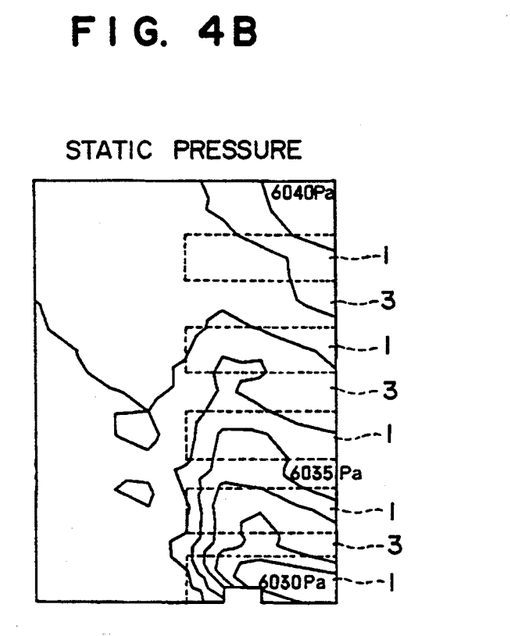
Figure 4C:
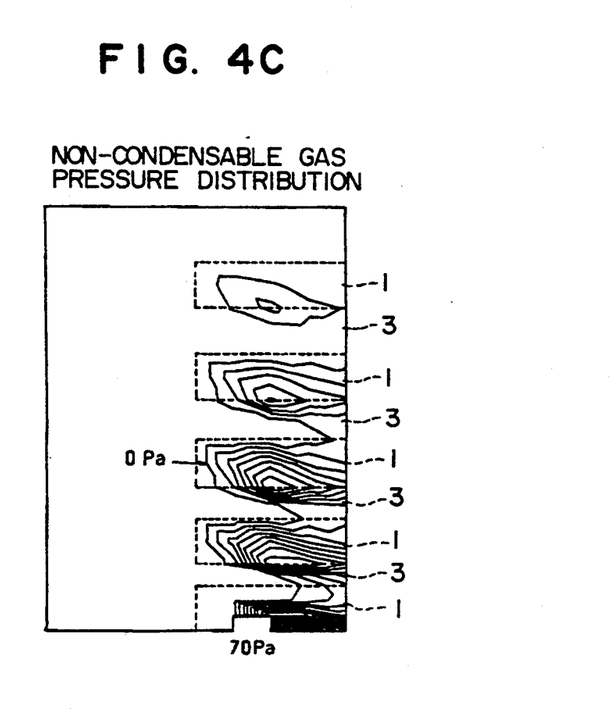

In order to demonstrate that the present invention is based upon a proper principle, a description will now be made of the results of a numerical analysis conducted on a basic model of the tube nest. This numerical analysis is to solve equations of laws of conservation of mass and momentum posed on the flow of steam. The detail of the analysis model is disclosed in PROCEEDING OF THE SECOND INTERNATIONAL SYMPOSIUM ON CONDENSERS AND CONDENSATION (1990), pp 235-244. FIGS. 3A to 3C show the results of the analysis conducted on a model of conventional condenser tube arrangement in which a plurality of tube groups of an equal width are arranged at a constant vertical pitch, while FIGS. 4A to 4C show the results of the analysis obtained on a model of condenser tube arrangement in accordance with the invention in which a plurality of tube groups 1 of an equal width are arranged such that the distance between the adjacent tube groups 1, i.e., the width of the steam access lane 3, progressively decreases towards the bottom. In each case, the analysis was conducted on a portion of the tube nest shown in FIG. 2 on an assumption that the steam flows horizontally into the tube nest. Assumptions also were made that the incoming steam contains 0.1 wt % of non-condensable gas component and that gaseous mixture is exhausted from the discharge port at a rate which is determined by the characteristic of the discharge system. The rate of discharge is about 1 wt % the rate of steam flowing into the tube nest. FIGS. 3A and 4A show states of flow of the steam. Greater lengths of arrow lines indicate higher levels of steam velocity. FIGS. 3B and 4B show static pressure distributions, while FIGS. 3C and 4C show non-condensable gas pressure distributions.

As will be seen from FIG. 3B, no static pressure gradient across the steam access lanes 3 is developed in the conventional arrangement in which the tube groups are arranged at a constant spacing. In this case, therefore, the non-condensable gases are caused to stagnate in the second and third tube group from the top of the tube nest, as will be seen from FIG. 3C. The analysis result showed that the region in which the non-condensable gases stagnate is not fixed but moves in relation to time. Practical point of view also denies that the region of stagnation of non-condensable gases is fixedly determined. It is therefore impossible to efficiently discharge non-condensable gases in the conventional condenser in which the tube groups are arranged at constant spacings.

In contrast, in the case of the analysis model in which the widths of the steam access lanes 3 are reduced towards the bottom of the condenser as in the present invention, a static pressure distribution is created such that the static pressure is higher in the top region of the tube nest than in the bottom region of the same, as shown in FIG. 4B. Consequently, the non-condensable gases also are concentrated to the bottom region, as shown in FIG. 4C, so as to enable efficient discharge of the non-condensable gases.

As will be realized from the described analysis results, the condenser constructed in accordance with the present invention can efficiently concentrate non-condensable gases to the bottom region so as to facilitate discharge of such gases. Consequently, the condenser embodying the present invention exhibits improved heat transfer, which enables the condenser inlet steam pressure to be maintained low, thus contributing to improvement in the efficiency of the power generating plant incorporating the condenser. Furthermore, the construction of the condenser can be simplified because there is no need for local concentration of cooling tubes.

Figure 5:
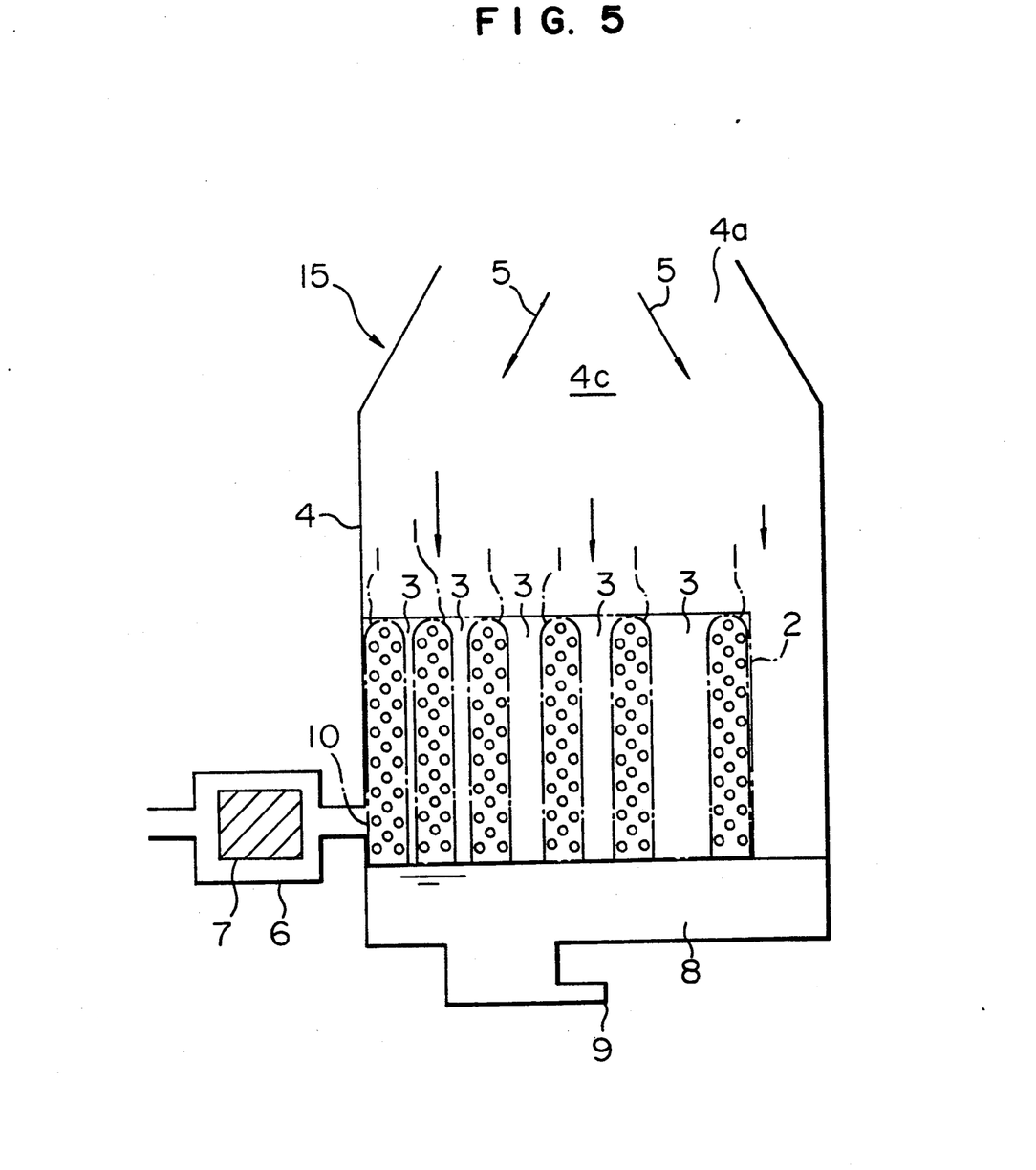
FIG. 5 is a sectional view of a steam condenser as a second embodiment of the heat exchanger of the present invention.

FIG. 5 shows a condenser as a second embodiment of the heat exchanger in accordance with the invention in which a plurality of vertical tube groups 1 each having a plurality of heat transfer tubes are disposed in a horizontally spaced side-by-side relationship so as to define vertical steam access lanes 3 between adjacent tube groups 1. All the tube groups 1 have an equal horizontal thickness but the spacing between adjacent tube groups, i.e., the width of the steam access lanes 3, is varied so as to decrease towards the non-condensable discharging port 10 which is formed in a lateral side of the vessel 4 and which communicates with the leftmost tube group 1 as viewed in FIG. 5. In this embodiment, the non-condensable gas discharging port 10 is provided in the lower left side of the vessel 4 as viewed in FIG. 5 and the steam access lanes 3 directly communicate with an inlet chamber 4c which is provided immediately under the inlet 4a. With this arrangement, it is possible to prevent the steam from escaping to the bottom of the condenser through the wider steam access lanes 3. In order to prevent such an escape, it is possible to use a bulkhead in place of the condensate reservoir 8. It will be understood that this embodiment also creates a static pressure distribution or gradient such that the static pressure decreases towards the non-condensable gas discharging port. It is therefore possible to efficiently discharge non-condensable gases and to realize a condenser having a simple construction of tube nest without any local concentration of the heat transfer tubes.

Figure 6:
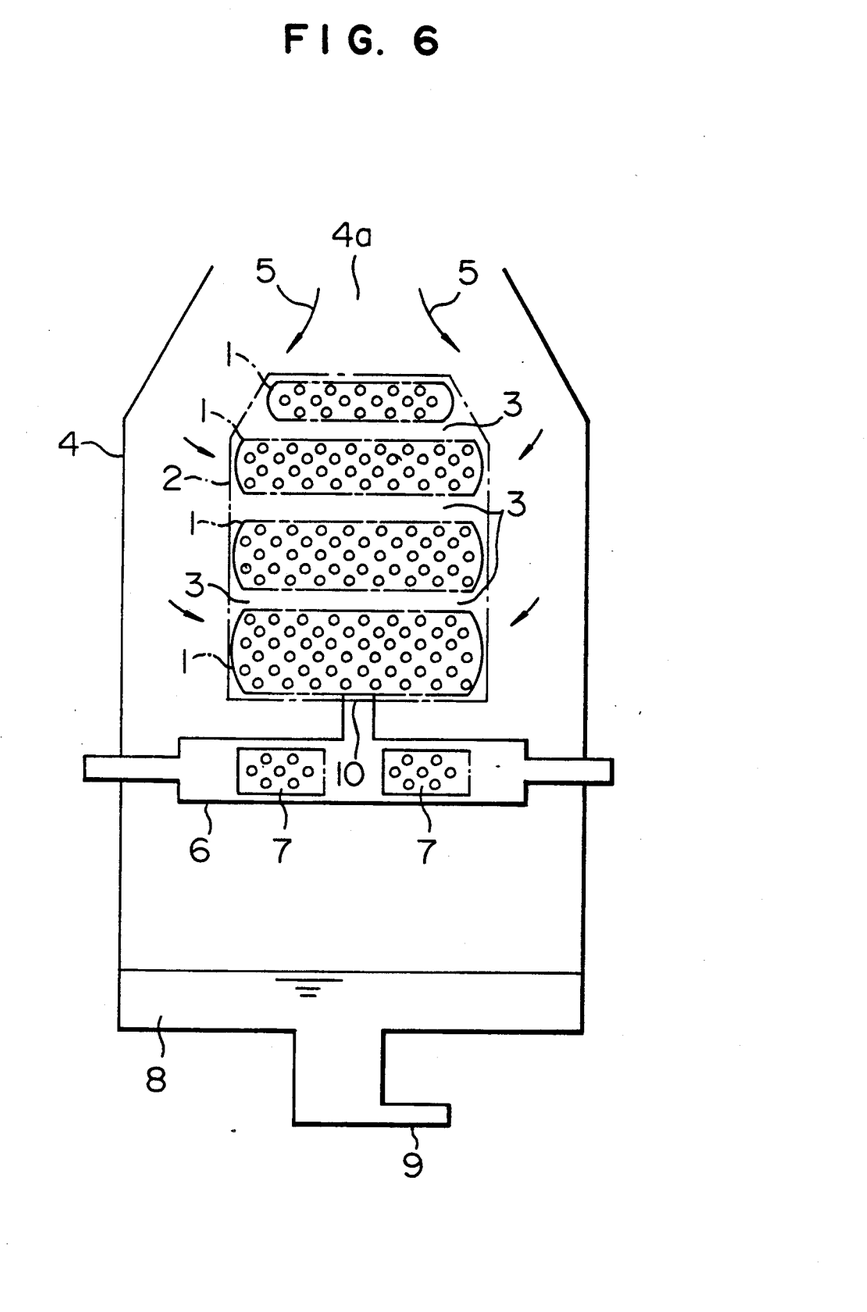
FIG. 6 is a sectional view of a steam condenser as a third embodiment of the heat exchanger of the present invention.

FIG. 6 shows a condenser which is a third embodiment of the heat exchanger of the present invention, wherein the thicknesses of the tube groups 1 are varied such that the tube group adjacent the bottom of the heat exchanger has a greater width, whereas all the steam access lanes 3 have an equal width. In this embodiment, the tube group 1 closer tot the bottom of the condenser provides a greater heat transfer area and, hence, a greater rate of condensation. Consequently, a greater flow rate of steam is realized in the steam access lane closer to the bottom of the condenser. Since all the steam access lanes have an equal width, the flow velocity of the steam is higher in the steam access lane closer to the bottom of the condenser. Consequently, such a static pressure distributor is developed in the condenser that the static pressure is higher in the upper portion of the condenser than in the lower portion of the same. It is therefore possible also in this embodiment to efficiently discharge non-condensable gases and to realize a condenser having a simple construction of tube nest without any local concentration of the cooling tubes.

Figure 7:
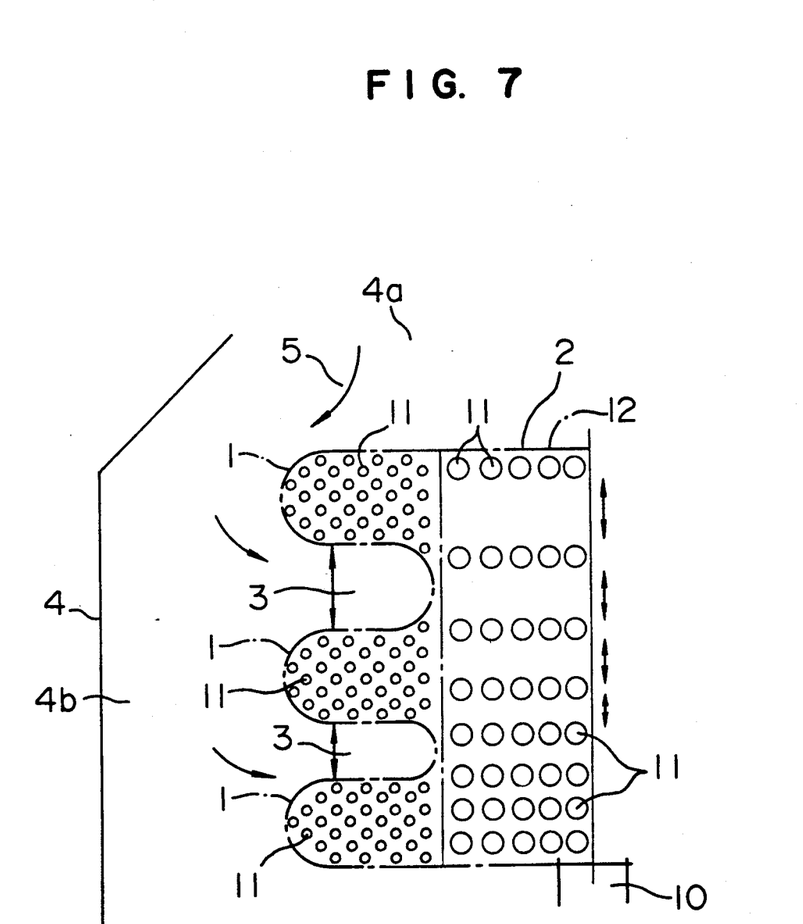
FIG. 7 is a sectional view of a half of a steam condenser as a fourth embodiment of the heat exchanger of the present invention.
Figure 8:
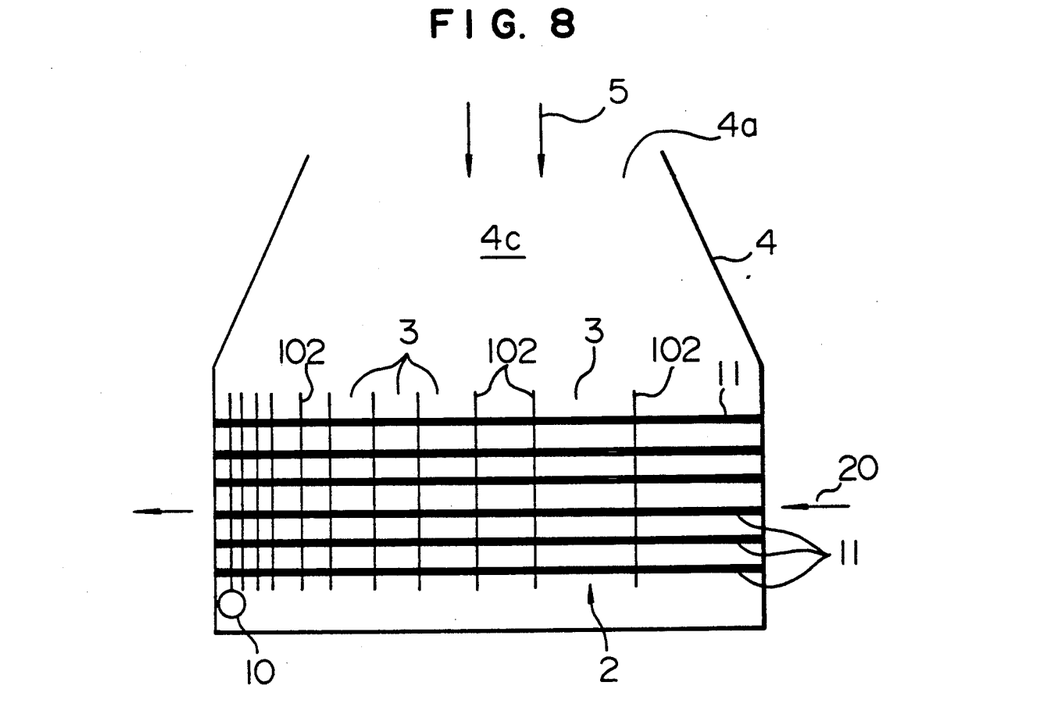
FIG. 8 is a sectional view of a steam condenser as a fifth embodiment of the heat exchanger of the present invention.
Figure 9:
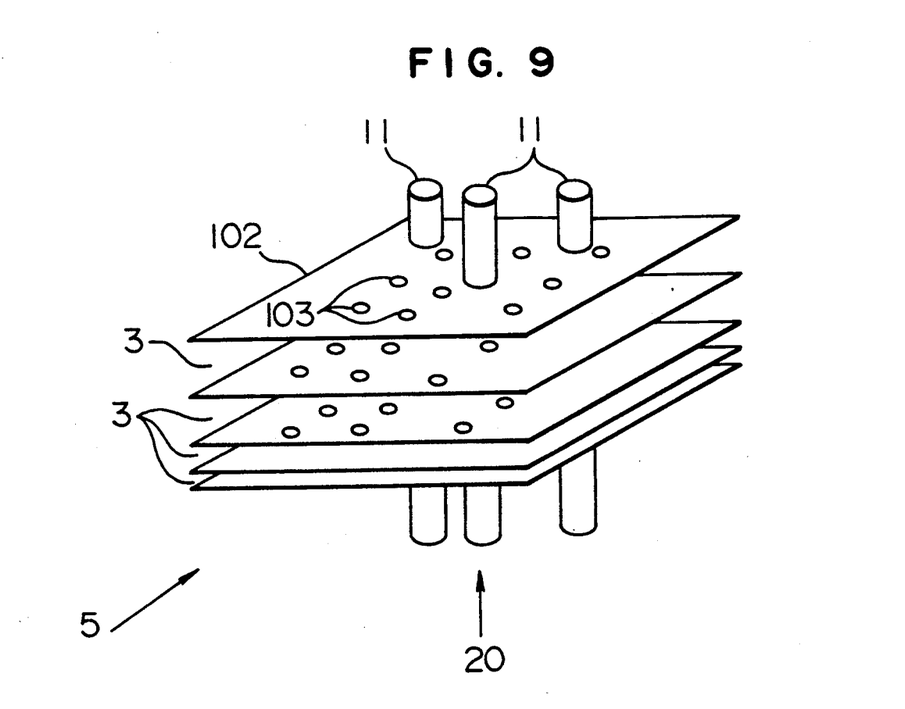
FIG. 9 is a partly-enlarged perspective view showing the internal structure of the condenser shown in FIG. 8.

FIG. 7 and FIGS. 8 and 9 respectively show different embodiments of the heat exchanger of the present invention, in which the densities of heat exchanging surfaces of the tube groups increase towards the discharge ports 10.

More specifically, a fourth embodiment shown in FIG. 7 has a tube nest 2 which includes a tube group 12. A discharge port 10 communicates with the bottom region of the tube group 12. The tube group 12 has a plurality of cooling tubes 11 the density of which increases towards the discharge port 10. Consequently, higher flow velocity and, hence, lower static pressure are developed in the region closer to the discharge port 10. The tube nest 2 further includes three additional tube groups 1 which are connected to and communicate with each lateral side of the tube group 12. FIG. 7 shows only the three additional tube groups 1 connected to the left side of the tube group 12. These three additional tube groups 1 on each side of the tube group 12 are spaced so that a steam access lane 3 is formed between each adjacent pair of additional tube groups 1. The additional tube groups 1 are so arranged that the size of the steam access lane 3 in terms of the distance between adjacent additional tube groups 1 is so varied that the size of the lane 3 closer to the discharge port 10 is smaller than that of the lane 3 remoter from the discharge port 10. The tube nest 2 is disposed in a vessel 4 such that an additional lane 4b is defined between the wall of the vessel 4 and the additional tube groups 1 on each lateral side of the tube group 12, so that the lanes 3 formed between adjacent additional tube groups 1 communicate with an inlet 4a through the additional lane 4b. A static pressure gradient is formed also in this embodiment such that the static pressure decreases towards the discharge port 10, thus enabling an efficient discharge of non-condensable gases. This effect can be produced to some extent by the tube group 12 alone.

The embodiment shown in FIGS. 8 and 9 is a heat exchanger which is used as a freon condenser in a freon power generating plant. This embodiment does not produce remarkable effect when used in liquefying a medium having large latent heat, e.g., water, because in such a case the efficiency of the fins is small. In other words, this embodiment is effective when used for condensing a gas having a small latent heat such as freon. Referring to FIGS. 8 and 9, the heat exchanger has cooling tubes 11 carrying a plurality of fins 102 attached thereto. Vapor passages 3 are formed between adjacent fins 102. The fins 102 tend to impede the flow of the gas along the cooling tubes 11. In order to suppress this tendency, a plurality of holes 103 are formed in each fin 102. In this embodiment, cooling tubes 11 exist also in the vapor passages 3 to produce resistance against the flow of the gas in these passages 3. In order to reduce this flow resistance, the cooling tubes are arranged coarsely or regularly in the form of a square lattice. The vapor to be liquefied flows into the condenser as indicated by arrows 5 so as to be liquefied on the surfaces of the cooling tubes 11 and the fins 102. In this embodiment, the width of the vapor passage 3, i.e., the distance between each adjacent pair of fins 102, is so varied that the vapor passage 3 closer to a discharge port 10 is smaller. The rates of condensation of the vapor on all fins 102 can be regarded as being substantially equal. Consequently, flow velocity of the vapor is higher in the downstream vapor passage 3 than in the upstream vapor passage 3, so that a lower static pressure is established in the downstream vapor passages 3 than in the upstream vapor passages 3. As a result, vapor flows through the holes 103 in the fins 102 from the upstream region where the static pressure is higher towards the downstream end where the static pressure is lower. Consequently, non-condensable gases are concentrated to the downstream region where the discharge port 10 is provided, whereby the non-condensable gases are efficiently discharged.

Thus, the present invention can improve heat transfer efficiency not only in steam condensers for liquefying steam but also in condensers for vapors or condensable gases which contain non-condensable gas components.

Figure 10:
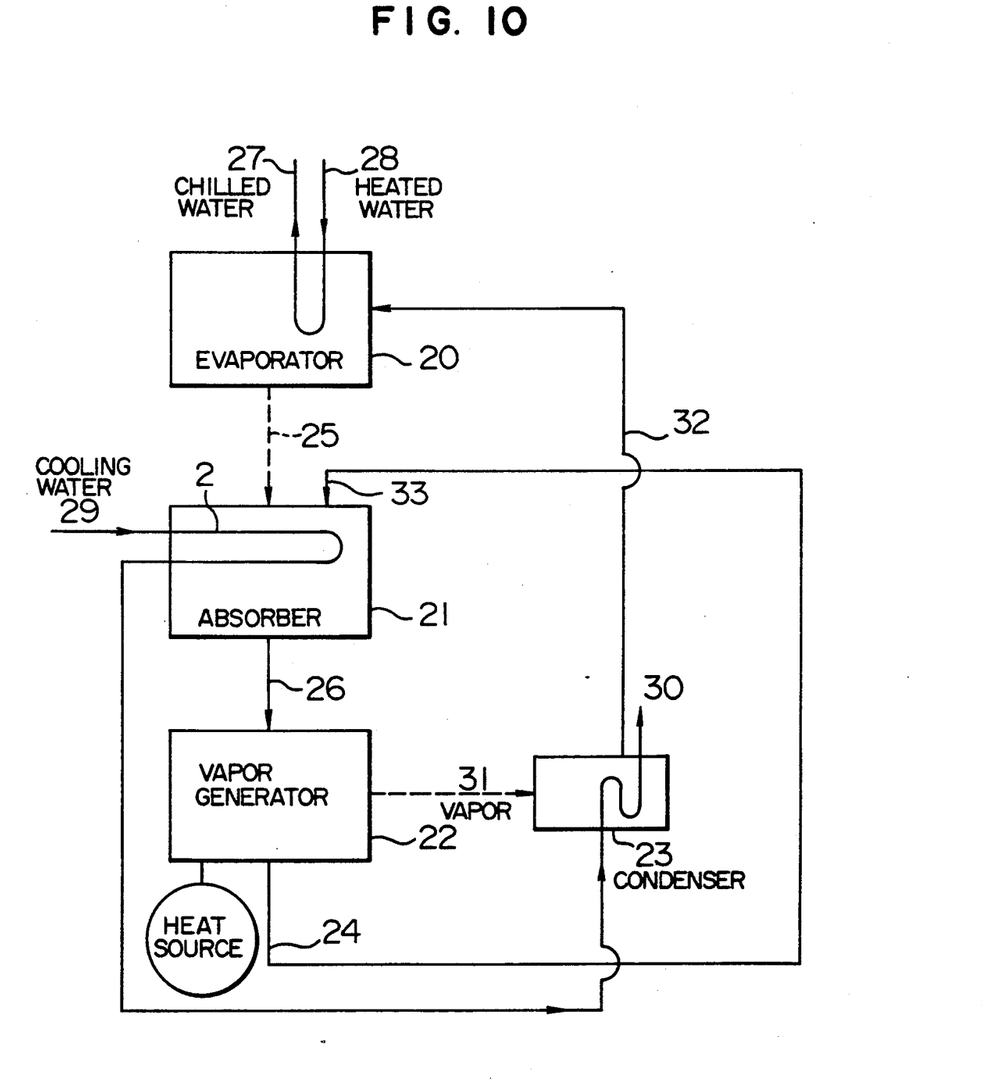
FIG. 10 is a block diagram of an absorption refrigerator embodying the present invention.

A description will now be made of a further embodiment of the invention applied to an absorption refrigerator with specific reference to FIGS. 10 and 11. The absorption refrigerator has a vapor generator 22 for heating an absorbent liquid so as to generate a first vapor and thick absorbent liquid, a condenser 23 for condensing the first vapor into a first liquid, an evaporator 20 for evaporating the first liquid to generate a second vapor, an absorber 21 for cooling and liquefying the second vapor, and means for introducing the thick absorbent liquid into the absorber 21 from the vapor generator 22. The vapor generated in the vapor generator 22 is introduced into the condenser 23 as indicated by a broken-line arrow 31 so as to be condensed into liquid phase through heat exchange with cooling water flowing through a pipeline 29 in the condenser 23. As a consequence, the water flowing through the pipeline 29 is heated and the heated water is discharged from the condenser 23 as indicated by an arrow 30. The liquid obtained in the condenser 23 flows into the evaporator 20 through a pipeline 32 so as to be evaporated through a heat exchange with heated water denoted by an arrow 28. The vapor thus obtained flows into the absorber 21 as indicated by a broken-line arrow 25. The heated water 28 is chilled as a result of the heat exchange in the evaporator 20 and flows out of the evaporator 20 as indicated by an arrow 27.

Figure 11:
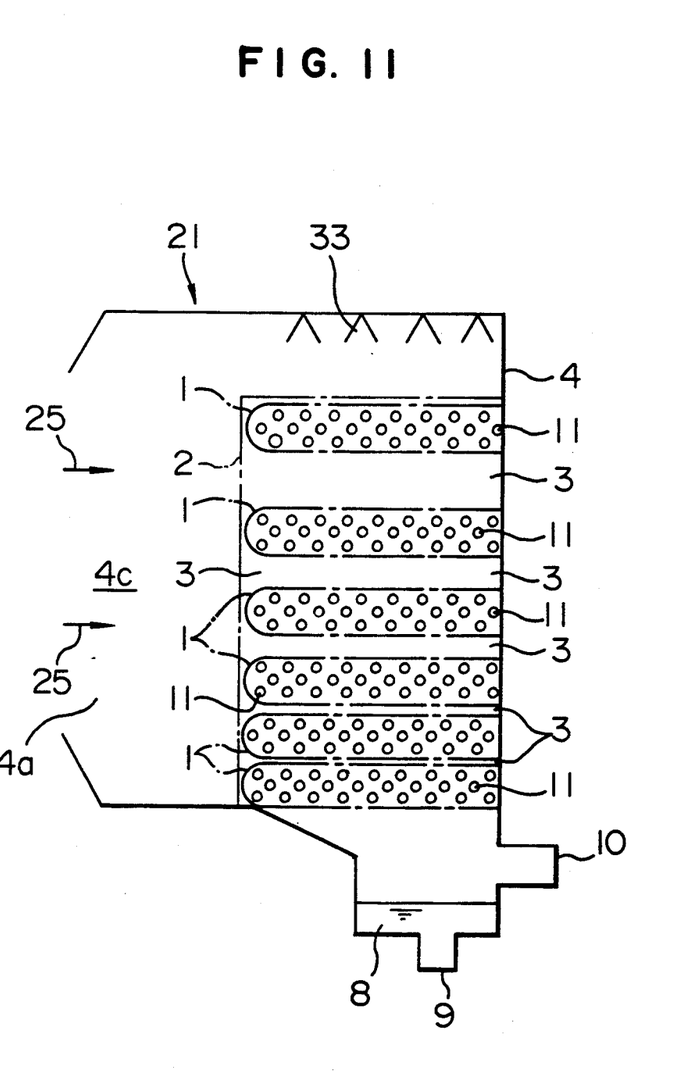
FIG. 11 is a sectional view of the absorber used in the refrigerator shown in FIG. 10.

As shown in FIG. 11, the absorber 21 has a vessel 4 and a tube nest 2 disposed inside the vessel 4. The cooling water which flows through pipeline 29 passes through the tube nest 2. The vessel 4 has an inlet 4a which opens at its one lateral side. Vapor from the evaporator 20 flows into the vessel 4 through the inlet opening 4a. The tube nest 2 has a plurality of tube groups 1 which are arranged such that a plurality of horizontal vapor passages 3, which communicate with an inlet chamber 4c, are defined between tube groups 1. A plurality of nozzles 33 are disposed above the tube nest 2 and attached to the top wall of the vessel 4. The absorbent liquid thickened in the vapor generator 22 is supplied to the nozzles 33 through a pipeline 24 so as to be sprayed onto the tube nest 2 from the nozzles 33. The vapor flowing from the evaporator 20 into the absorber 21 is cooled and then flows through the tube nest 2 so as to be condensed into liquid phase which is absorbed by the thickened absorbent liquid sprayed from the nozzles 33. Thus, the thick absorbent liquid absorbs the liquid phase and thus is thinned and the thinned absorbent liquid is collected in a liquid reservoir 8. The absorbent liquid is then returned from the reservoir 8 to the vapor generator 22 through a pipeline 26 so as to be heated therein. This cycle is performed repeatedly and continuously. Meanwhile, the non-condensable gases are discharged through a discharge port 10 provided in the vessel 4.

In the described absorption refrigeration system, the pressures in the evaporator 20 and the absorber 21 are maintained low enough to cause evaporation at a temperature lower than the normal temperature by the latent heat derived from the heated water 28. Consequently, the temperature of the chilled water 27 can be lowered when the absorption pressure in the absorber 21 is maintained low. In addition, in the described system, the cooling water 29 is heated by the heat which is derived from the heated water 28. The lower the absorption pressure in the absorber 21, the greater the rate of transfer of the heat from the heated water 28 to the cooling water 29.

The term "absorption" means condensation which is performed by using an absorbent liquid as a condensation medium. The absorbent liquid is typically an aqueous solution of lithium bromide (LiBe). This liquid is sprayed from the nozzles 33 onto the tube nest 2 so as to be cooled on the surfaces of the cooling tubes 11. The condensation latent heat which is released when the vapor is condensed is absorbed by the medium flowing through the heat transfer tubes. It is assumed here that the rate of absorption of the vapor is constant, although it actually depends on the concentration and temperature of the absorbent liquid. The tube nest 2 in the absorber 21 is so constructed that the width of the vapor passage 3 closer to the downstream end is smaller than that of the vapor passage 3 remoter from the same. Consequently, a lower static pressure is established in the downstream region of the absorber 21 to attract non-condensable gases. The non-condensable gases thus collected are efficiently discharged from the discharge port 10 provided in the bottom of the absorber.

In this embodiment also, it is possible to efficiently discharge the non-condensable gases contained in the vapor, whereby the performance of the absorption refrigerator is improved.

As has been described, according to the present invention, a static pressure gradient is established in a heat exchanger transversely of parallel vapor passages formed in the heat exchanger. Consequently, a flow of vapor is induced so as to concentrate non-condensable gas components to the downstream end of the heat exchanger to assure an efficient discharge of the non-condensable gases, thereby improving the heat transfer efficiency of the heat exchanger.

What is claimed is:

1. A heat exchanger for performing a heat exchange between a vapor containing non-condensable gas components and a heat exchanging medium, thereby condensing said vapor into liquid phase, said heat exchanger comprising:

a vessel having a vapor inlet for receiving said vapor containing said non-condensable gas components and a discharge port through which said non-condensable gas components are to be discharged; and a tube nest disposed in said vessel and having a plurality of tubes through which said heat exchanging medium flows;

said vapor containing non-condensable gas components flowing towards said discharge port across said tube nest so as to be condensed into liquid phase through heat exchange with said heat exchanging medium flowing through said tubes while said non-condensable gas components are separated from said liquid phase and flow towards said discharge port;

said tube nest having such a structure as to produce a change in the dynamic pressure of flow of said vapor towards said discharge port for thereby creating such a static pressure distribution in said heat exchanger that a lower static pressure is established in a region where said discharge port is provided than in a region where said vapor inlet is provided, wherein said tube nest comprises a plurality of tube groups disposed in spaced relationship to define therebetween vapor passages communicating with said vapor inlet, said discharge port being disposed adjacent one of said tube groups, said tube groups being so arranged that the widths of said vapor passages in terms of the distance between adjacent tube groups are varied such that the width of a vapor passage closer to said discharge port is smaller than the width of a vapor passage remoter from said discharge port, and wherein said tube nest is disposed in said vessel such that at least one additional vapor passage is defined between said tube nest and a wall of said vessel, said vapor passages formed between adjacent tube groups communicating with said inlet through said additional passage.

2. A heat exchanger for performing a heat exchange between a vapor containing non-condensable gas components and a heat exchanging medium, thereby condensing said vapor into liquid phase, said heat exchanger comprising:

a vessel having a vapor inlet for receiving said vapor containing said non-condensable gas components and a discharge port through which said non-condensable gas components are to be discharged; and a tube nest disposed in said vessel and having a plurality of tubes through which said heat exchanging medium flows;

said vapor containing non-condensable gas components flowing towards said discharge port across said tube nest so as to be condensed into liquid phase through heat exchange with said heat exchanging medium flowing through said tubes while said non-condensable gas components are separated from said liquid phase and flow towards said discharge port;

said tube nest having such a structure as to produce a change in the dynamic pressure of flow of said vapor towards said discharge port for thereby creating such a static pressure distribution in said heat exchanger that a lower static pressure is established in a region where said discharge port is provided than in a region where said vapor inlet is provided, wherein said tube nest comprises a plurality of tube groups disposed in spaced relationship to define therebetween vapor passages communicating with said vapor inlet, said discharge port being disposed adjacent one of said tube groups, said tube groups being so arranged that the widths of said vapor passages in terms of the distance between adjacent tube groups are varied such that the width of a vapor passage closer to said discharge port is smaller than the width of a vapor passage remoter from said discharge port, and wherein said vessel has formed therein an inlet chamber disposed in communication with said vapor inlet, said tube nest being so disposed that said vapor passages are in direct communication with said inlet chamber.

3. A heat exchanger according to claim 1, wherein said tube nest is disposed in said vessel such that at least one additional vapor passage is defined between said tube nest and a wall of said vessel, said vapor passages formed between adjacent tube groups communicating with said vapor inlet through said additional passage.

4. A heat exchanger according to claim 1, wherein the tubes of the tube a are so arranged that the density of said tubes increases towards said discharge port.

5. A heat exchanger according to claim 4, wherein said tube group has at least one lateral side, said tube nest further includes a plurality of additional tube groups which are connected to said one lateral side of said tube group in communication therewith, said additional tube groups being disposed in spaced relationship to define vapor passages therebetween, the widths of said vapor passages in terms of the distance between adjacent additional tube groups being so varied that the width of the vapor passage closer to said discharge port is smaller than the width of the vapor passage remoter from said discharge port, said tube nest being disposed in said vessel such that an additional vapor passage is defined between said tube nest and a wall of said vessel, said passages between said additional tube groups communicating with said vapor inlet through said additional vapor passage.

6. A power generating plant including steam generating means for generating steam, turbine means driven by the steam generated in said steam generating means, a condenser for condensing into liquid phase the steam which has driven said turbine means, and feeding means for returning the liquid phase to said steam generating means, said steam containing non-condensable gas components, wherein said condenser comprises a heat exchanger for performing a heat exchange between said steam containing non-condensable gas components and a heat exchanging medium, thereby condensing said steam into liquid phase, said heat exchanger comprising:

a vessel having a steam inlet for receiving said steam containing said non-condensable gas components and a discharge port through which said non-condensable gas components are to be discharged; and a tube nest disposed in said vessel and having a plurality of tubes through which said heat exchanging medium flows;

said steam containing said non-condensable gas components flowing towards said discharge port across said tube nest so as to be condensed into liquid phase through heat exchange with said heat exchanging medium flowing through said tubes while said non-condensable gas components are separated from said liquid phase and flow towards said discharge port;

said tube nest having such a structure as to produce a change in the dynamic pressure of flow of said vapor towards said discharge port for thereby creating such a static pressure distribution in said heat exchanger that a lower static pressure is established in a region where said discharge port is provided than in a region where said vapor inlet is provided, wherein said tube nest comprises a plurality of tube groups disposed in spaced relationship to define therebetween steam access lanes communicating with said steam inlet, said discharge port being disposed adjacent one of said tube groups, said tube groups being so arranged that the widths of said steam access lanes in terms of the distance between adjacent tube groups are varied such that the width of a steam access lane closer to said discharge port is smaller than the width of a steam access lane remoter from said discharge port, and wherein said tube nest is disposed in said vessel such that at least one additional vapor passage is defined between said tube nest and a wall of said vessel, said vapor passages formed between adjacent tube groups communicating with said inlet through said additional passage.

7. A power generating plant according to claim 6, wherein an additional tube group, is provided with tubes being arranged such that the density of said tubes increases towards said discharge port, said additional tube group being connected to at least one lateral side of said plurality of tube groups in communication therewith. spaced relationship to form steam access lanes therebetween, the width of said steam access lanes in terms of the distance between adjacent additional tube groups being so varied that the width of a steam access lane closer to said discharge port is smaller than the width of a steam access lane remoter from said discharge port, said tube nest being disposed in said vessel such that an additional steam access lane is defined between said tube nest and a wall of said vessel, said lanes between said additional tube groups communicating with said steam inlet through said additional steam access lane.

8. An absorption refrigerator including a vapor generator for heating an absorbent liquid to generate first vapor and thickened absorbent liquid, a condenser for condensing the first vapor into first liquid, an evaporator for evaporating the first liquid thereby generating second vapor, an absorber for cooling and condensing the second vapor into liquid phase, and means for introducing the thickened absorbent liquid from said vapor generator into said absorber, said second vapor containing non-condensable gas components which are separated from said second vapor when said second vapor is condensed in said absorber, said thickened absorbent liquid being introduced into said absorber to absorb the liquid phase formed by condensation in said absorber, whereby said thickened absorbent is thinned by said liquid phase, the thinned absorbent liquid being then returned to said vapor generator, said absorber comprising a heat exchanger for performing a heat exchange between said second vapor and a heat exchanging medium, thereby condensing said second vapor into liquid phase, said heat exchanger comprising:

a vessel having a vapor inlet for receiving said vapor containing said non-condensable gas components and a discharge port through which said non-condensable gas components are to be discharged; and a tube nest disposed in said vessel and having a plurality of tubes through which said heat exchanging medium flows;

said vapor containing non-condensable gas components flowing towards said discharge port across said tube nest so as to be condensed into liquid phase through heat exchange with said heat exchanging medium flowing through said tubes while said non-condensable gas components are separated from said liquid phase and flow towards said discharge port;

said tube nest having such a structure as to produce a change in the dynamic pressure of flow of said vapor towards said discharge port for thereby creating such a static pressure distribution in said heat exchanger that a lower static pressure is established in a region where said discharge port is provided than in a region where said vapor inlet is provided, wherein said tube nest comprises a plurality of tube groups disposed in spaced relationship to define therebetween vapor passages communicating with said vapor inlet, said discharge port being disposed adjacent one of said tube groups, said tube groups being so arranged that the widths of said vapor passages in terms of the distance between adjacent tube groups are varied such that the width of a vapor passage closer to said discharge port is smaller than the width of a vapor passage remoter from said discharge port, and wherein said tube nest is disposed in said vessel such that at least one additional vapor passage is defined between said tube nest and a wall of said vessel, said vapor passages formed between adjacent tube groups communicating with said inlet through said additional passage.

9. An absorption refrigerator according to claim 8, wherein said tube nest is disposed in said vessel such that said vapor passages extend substantially horizontally and wherein said means for introducing said thickened absorbent liquid include absorbent spraying means disposed above said tube nest and attached to a wall of said vessel.

10. A power generating plant including steam generating means for generating steam, turbine means driven by the steam generated in said steam generating means, a condenser for condensing into liquid phase the steam which has driven said turbine means, and feeding means for returning the liquid phase to said steam generating means, said steam containing non-condensable gas components, wherein said condenser comprises a heat exchanger for performing a heat exchange between said steam containing non-condensable gas components and a heat exchanging medium, thereby condensing said steam into liquid phase, said heat exchanger comprising:

a vessel having a steam inlet for receiving said steam containing said non-condensable gas components and a discharge port through which said non-condensable gas components are to be discharged; and a tube nest disposed in said vessel and having a plurality of tubes through which said heat exchanging medium flows;

said steam containing said non-condensable gas components flowing towards said discharge port across said tube nest so as to be condensed into liquid phase through heat exchange with said heat exchanging medium flowing through said tubes while said non-condensable gas components are separated from said liquid phase and flow towards said discharge port;

said tube nest having such a structure as to produce a change in the dynamic pressure of flow of said vapor towards said discharge port for thereby creating such a static pressure distribution in said heat exchanger that a lower static pressure is established in a region where said discharge port is provided than in a region where said vapor inlet is provided, wherein said tube nest comprises a plurality of tube groups disposed in spaced relationship to define therebetween steam access lanes communicating with said steam inlet, said discharge port being disposed adjacent one of said tube groups, said tube groups being so arranged that the widths of said steam access lanes in terms of the distance between adjacent tube groups are varied such that the width of a steam access lane closer to said discharge port is smaller than the width of a steam access lane remoter from said discharge port, and wherein said vessel has formed therein an inlet chamber disposed in communication with said steam inlet, said tube nest being so disposed that said steam access lanes are in direct communication with said inlet chamber.

11. An absorption refrigerator including a vapor generator for heating an absorbent liquid to generate first vapor and thickened absorbent liquid, a condenser for condensing the first vapor into first liquid, an evaporator for evaporating the first liquid thereby generating second vapor, an absorber for cooling and condensing the second vapor into liquid phase, and means for introducing the thickened absorbent liquid from said vapor generator into said absorber, said second vapor containing non-condensable gas components which are separated from said second vapor when said second vapor is condensed in said absorber, said thickened absorbent liquid being introduced into said absorber to absorb the liquid phase formed by condensation in said absorber, whereby said thickened absorbent is thinned by said liquid phase, the thinned absorbent liquid being then returned to said vapor generator, said absorber comprising a heat exchanger for performing a heat exchange between said second vapor and a heat exchanging medium, thereby condensing said second vapor into liquid phase, said heat exchanger comprising:

a vessel having a vapor inlet for receiving said vapor containing said non-condensable gas components and a discharge port through which said non-condensable gas components are to be discharged; and a tube nest disposed in said vessel and having a plurality of tubes through which said heat exchanging medium flows;

said vapor containing non-condensable gas components flowing towards said discharge port across said tube nest so as to be condensed into liquid phase through heat exchange with said heat exchanging medium flowing through said tubes while said non-condensable gas components are separated from said liquid phase and flow towards said discharge port;

said tube nest having such a structure as to produce a change in the dynamic pressure of flow of said vapor towards said discharge port for thereby creating such a static pressure distribution in said heat exchanger that a lower static pressure is established in a region where said discharge port is provided than in a region where said vapor inlet is provided, wherein said tube nest comprises a plurality of tube groups disposed in spaced relationship to define therebetween vapor passages communicating with said vapor inlet, said discharge port being disposed adjacent one of said tube groups, said tube groups being so arranged that the widths of said vapor passages in terms of the distance between adjacent tube groups are varied such that the width of a vapor passage closer to said discharge port is smaller than the width of a vapor passage remoter from said discharge port, and wherein said vessel has formed therein an inlet chamber disposed in communication with said vapor inlet, said tube net being so disposed that said vapor passages are in direct communication with said inlet chamber.

12. An absorption refrigerator according to claim 11, wherein said tube nest is disposed in said vessel such that said vapor passages extend substantially horizontally and wherein said means for introducing said thickened absorbent liquid include absorbent spraying means disposed above said tube nest and attached to a wall of said vessel.

* * * * *